US009688335B2

United States Patent
Ishikawa et al.

(10) Patent No.: US 9,688,335 B2
(45) Date of Patent: Jun. 27, 2017

(54) MOTORCYCLE BODY COVER CONSTRUCTION

(71) Applicant: HONDA MOTOR CO., LTD., Tokyo (JP)

(72) Inventors: Akiko Ishikawa, Wako (JP); Taro Nishimoto, Wako (JP); Kazunori Yoshimura, Wako (JP); Ayumu Tsuji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/908,317

(22) PCT Filed: Jul. 31, 2013

(86) PCT No.: PCT/JP2013/070818
§ 371 (c)(1),
(2) Date: Jan. 28, 2016

(87) PCT Pub. No.: WO2015/015610
PCT Pub. Date: Feb. 5, 2015

(65) Prior Publication Data
US 2016/0176464 A1    Jun. 23, 2016

(51) Int. Cl.
*B62J 15/02*    (2006.01)
*B62J 17/02*    (2006.01)
(Continued)

(52) U.S. Cl.
CPC .............. *B62J 15/00* (2013.01); *B62J 15/02* (2013.01); *B62J 17/02* (2013.01); *B62J 23/00* (2013.01);
(Continued)

(58) Field of Classification Search
CPC ... B62J 15/02; B62J 15/04; B62J 17/02; B62J 17/04; B62J 17/06; B62J 23/00; B62K 19/48
(Continued)

(56) References Cited

U.S. PATENT DOCUMENTS

| 4,678,223 A | 7/1987 | Kishi et al. |
| 6,073,719 A * | 6/2000 | Ohmika ................. B62K 11/04 180/219 |

(Continued)

FOREIGN PATENT DOCUMENTS

| EP | 2 168 850 A1 | 3/2010 |
| EP | 2428437 A1 * | 3/2012 .............. B62J 17/02 |

(Continued)

OTHER PUBLICATIONS

International Search Report and Written Opinion dated Nov. 5, 2013 corresponding to International Patent Application No. PCT/JP2013/070818 and English translation thereof.

Primary Examiner — Joseph Rocca
Assistant Examiner — Maurice Williams
(74) Attorney, Agent, or Firm — Squire Patton Boggs (US) LLP

(57) ABSTRACT

A body cover construction for a motorcycle includes a body cover having a front mudguard which covers an outer circumference of a front wheel, a front cover covering a front portion of a vehicle body from a front to sides of a headstock, floorboards extending from a lower rear portion of the front cover to below a seat so that rider's feet rest thereon, and underside covers covering sides of the vehicle body lying below and forwards of the floorboards. When the vehicle body is seen from a side, a lower edge portion of a front side surface of the front cover extends in a longitudinal direction and is at a similar level as a lower edge portion of a mudguard side surface of the mudguard. A front upper end
(Continued)

portion of the underside cover extends upwards to a position which is a predetermined distance from the lower edge portion.

5 Claims, 9 Drawing Sheets

(51) Int. Cl.
*B62J 23/00* (2006.01)
*B62K 19/48* (2006.01)
*B62J 15/00* (2006.01)
*B62J 25/00* (2006.01)
*B62J 17/00* (2006.01)

(52) U.S. Cl.
CPC .............. *B62K 19/48* (2013.01); *B62J 17/00* (2013.01); *B62J 25/00* (2013.01)

(58) Field of Classification Search
USPC ........................................................ 296/78.1
See application file for complete search history.

(56) References Cited

U.S. PATENT DOCUMENTS

| | | | | |
|---|---|---|---|---|
| 2007/0069545 A1* | 3/2007 | Katagiri | ............... | B62J 29/00 296/78.1 |
| 2008/0202836 A1* | 8/2008 | Atsuchi | ............... | B62J 17/00 180/229 |
| 2009/0108630 A1* | 4/2009 | Nakao | ............... | B62K 11/04 296/192 |
| 2011/0074183 A1* | 3/2011 | Kanezuka | ............... | B62J 17/00 296/193.08 |
| 2011/0155493 A1* | 6/2011 | Kogo | ............... | B60Q 1/0433 180/68.3 |
| 2011/0180345 A1* | 7/2011 | Iida | ............... | B62K 11/04 180/309 |
| 2011/0192668 A1* | 8/2011 | Kitta | ............... | B60K 15/03504 180/219 |
| 2012/0061989 A1* | 3/2012 | Yasuhara | ............... | B62J 6/005 296/78.1 |
| 2012/0312609 A1* | 12/2012 | Takewaka | ............... | B60Q 5/008 180/65.1 |
| 2013/0057016 A1* | 3/2013 | Yamada | ............... | B62J 17/02 296/78.1 |
| 2013/0075178 A1* | 3/2013 | Petersson | ............... | B62J 17/02 180/220 |
| 2013/0249251 A1* | 9/2013 | Nakamura | ............... | B60H 1/26 296/208 |
| 2013/0320696 A1* | 12/2013 | Yokouchi | ............... | B62J 25/00 296/75 |
| 2013/0320697 A1* | 12/2013 | Yokouchi | ............... | B62J 17/065 296/78.1 |
| 2014/0312644 A1* | 10/2014 | Srabstein | ............... | B62J 17/08 296/89 |
| 2016/0144904 A1* | 5/2016 | Nishimoto | ............... | B62J 17/00 280/281.1 |

FOREIGN PATENT DOCUMENTS

| | | | | | |
|---|---|---|---|---|---|
| EP | 2712795 A1 | * | 4/2014 | ....... | F02M 35/10013 |
| EP | 2781444 A1 | * | 9/2014 | .............. | B62J 6/005 |
| EP | 2889209 A1 | * | 7/2015 | .............. | B62J 17/02 |
| JP | 61-110487 U | | 7/1986 | | |
| JP | 2009-179279 A | | 8/2009 | | |
| JP | 2010-83358 A | | 4/2010 | | |
| JP | 4835239 B2 | | 12/2011 | | |
| WO | WO 2009098925 A1 | * | 8/2009 | .............. | B62J 17/02 |

* cited by examiner

MOTORCYCLE BODY COVER CONSTRUCTION

TECHNICAL FIELD

The present invention relates to a motorcycle body cover construction.

BACKGROUND ART

In a vehicle such as a conventional motorcycle, as a body cover construction which forms a body shape, there is known, for example, a construction which has a front cover at the front of the vehicle, an inner cover which covers a rear portion of the front cover, a front leg shield at a lower portion of the front cover, and a leg shield lower cover at the rear of the front leg shield and has further a center cover which extends from the inner cover to the rear to cover the center of a body frame, side covers which extend from the center cover to the rear further to cover a rear portion of the body frame, and the like (for example, Patent Document 1).

PRIOR ART DOCUMENT

Patent Document

Patent Document 1: JP-4835239-B1

SUMMARY OF THE INVENTION

Problem that the Invention is to Solve

In conventional body cover constructions, the shape of a body cover including, for example, the shapes of contours, ridges, swellings, and openings is made use of to make the features or originality of a vehicle body conspicuous. Namely, the originality of a vehicle body is provided only by the features of a body cover thereof. Consequently, in order to provide a vehicle body which looks more original, it is desired to make use of peripheral constructions of a body cover to make the vehicle body look more original. Additionally, seeking too much only for well-designed vehicle body shapes results in a structural problem that the riding performance and riding comfort of a vehicle are affected by air flows produced by the vehicle body shape or a body cover so designed when the vehicle is ridden. Thus, one of functions of the body cover is to provide a good riding performance and riding comfort.

The invention has been made in view of these situations, and an object thereof is to provide a body cover construction for a motor cycle which can enhance the originality of a vehicle body shape and function well to produce preferable air flows.

Means for Solving the Problem

With a view to achieving the object, according to an invention of claim 1, there is provided
a body cover construction for a motorcycle including a body cover having:
a front mudguard which is provided so as to cover an outer circumference of a front wheel from thereabove;
a front cover which covers a front portion of a vehicle body from a front to sides of a headstock;
step floorboards which are disposed to extend from a lower and rear portion of the front cover to below a mounting seat so that feet of a rider rest thereon; and
under side covers which cover sides of the vehicle body which lie below and forwards of the step floorboards,
wherein, when the vehicle body is seen from a side thereof, a lower edge portion of a front side surface of the front cover extends in a front-to-rear direction and is formed substantially at the same level as a lower edge portion of a mudguard side surface of the front mudguard,
wherein a front upper end portion of the under side cover extends upwards to a position which is spaced a predetermined distance away from the lower edge portion of the front side surface,
wherein a projecting portion is formed on the front lower cover so as to be exposed between the lower edge portion of the front side surface and the front upper end portion and so as to face an external surface of the body cover, and
wherein the projecting portion curves convexly towards the front of the vehicle body.

According to an invention of claim 2, in addition to the configuration set forth in claim 1, there is provided the body cover construction,
wherein the step floorboard constitutes a lower side cover which rises upwards from a foot rest portion which extends in the front-to-rear direction, and
wherein a front end edge portion of the lower side cover and a rear end edge portion of the projecting portion are formed continuously.

According to an invention of claim 3, in addition to the configuration set forth in claim 1 or 2, there is provided the body cover construction,
wherein an external surface of the projecting portion constitutes a step in a widthwise direction and is formed so as to be depressed in the widthwise direction in relation to at least either of the front cover and the under side cover.

According to an invention of claim 4, in addition to the configuration set forth in claim 2 or 3, there is provided the body cover construction,
wherein the projecting portion and the lower side cover are formed from a different material or in a different color in relation to the front cover or the under side cover.

According to an invention of claim 5, in addition to the configuration set forth in any one of claims 1 to 4, there is provided the body cover construction,
wherein the projecting portion is locked on at least one of the body covers lying adjacent thereto via a locking portion.

Advantage of the Invention

According to the invention of claim 1, when the vehicle body is seen from the side thereof, a line formed by the lower edge portion of the front side surface and a line formed by the lower edge portion of the mudguard side surface of the front mudguard are formed so as to constitute substantially the single continuous line. Consequently, by including the front mudguard as part of an area which forms an external line which appears on the side surface of the body cover, it is possible to form a long continuous body shaping line which extends from the frontmost end portion of the vehicle body to the vicinity of the rear wheel in the front-to-rear direction. As a result of this, it is possible to represent the highlighting line which continues from the side surface of the body cover at the rear of the vehicle body to the frontmost end of the vehicle body, and therefore, it is possible to form the highlighting line which is long in the front-to-rear diction and which has never been realized heretofore, thereby imparting the originality to the shape of the vehicle body.

The front upper end portion of the under side cover extends upwards to the position which is spaced the predetermined distance away from the lower edge portion of the front side surface, whereby the lines formed by the lower edge portion of the mudguard side surface and the lower edge portion of the front side surface can be highlighted from the lower side of the vehicle body.

The projecting portion, which is exposed between the lower edge portion of the front side surface and the front upper end portion and which faces the external surface of the body cover, is formed on the front cover. Therefore, the member which is not visible in the conventional body cover construction is exposed. As a result of this, when the vehicle body is seen from the side thereof, the originality of the body shaping line in the lower portion of the front cover can be highlighted further by the appearance of the exposed portion which has never been produced in the conventional body construction.

The projecting portion is formed so as to curve convexly towards the front of the vehicle body, and this can enhance the rigidity of the front lower cover which bears air flows on the substantially whole area thereof.

According to the invention of claim 2, the step floorboard constitutes the lower side cover which rises upwards from the foot rest portion towards the top of the vehicle body, it is possible to provide a longitudinal accent which highlights the vehicle body shape substantially in the center of the side surface of the vehicle body. The front end edge portion of the lower side cover and the rear end edge portion of the projecting portion are formed continuously, and therefore, when the vehicle body is seen from the side thereof, the projecting portion and the lower side cover continue to form the single line which contacts the lower edge portion of the front side surface. As a result of this, the long line in the front-to-rear direction of the vehicle body which includes the lower edge portion of the front side surface can be identified easily, thereby enhancing the originality of the vehicle body shape.

The front end edge portion of the lower side cover and the rear end edge portion of the projecting portion continue to form a substantially single plane, and therefore, air flows guided from the projecting portion are allowed to flow to the rear of the vehicle body by way of the lower side cover. Consequently, air flows are allowed to pass to the leg portions of the rider appropriately, thereby enhancing the riding comfort of the rider.

According to the invention of claim 3, there is provided the step or difference in level between the projecting portion and the lower edge portion of the front side surface, and therefore, the line along the lower edge portion of the front side surface can be highlighted further, thereby enhancing the originality of the vehicle body shape further.

The projecting portion has the step in the widthwise direction of the vehicle body and is formed so as to be depressed in the widthwise direction in relation to at least either of the front cover and the under side cover. Therefore, air flows are allowed to be guided towards the rear of the vehicle body by making use of the step portion. As a result of this, air flows are allowed to pass to the leg portions of the rider appropriately, thereby enhancing the riding comfort of the rider.

According to the invention of claim 4, the projecting portion and the lower side cover are formed from the different material or in the different color in relation to the front cover or the under side cover. Therefore, the line along the lower edge portion of the front side surface can be distinct. Consequently, this can make the front cover or the under side cover prominent in external appearance. Consequently, the originality of the vehicle can be highlighted not only by the lines but also by color and tonality, whereby the originality of the vehicle can be enhanced further.

According to the invention of claim 5, the projecting portion is locked on at least one of the body covers lying adjacent thereto via the locking portion, and therefore, not only can the projecting portion be held rigidly and strongly, but also the body cover which lies adjacent thereto such as the under side cover or the lower side cover can be supported rigidly and strongly. The front lower cover which bears air flows coming from the front thereof can be held rigidly and strongly by the projecting portion.

MODE FOR CARRYING OUT THE INVENTION

Figure 1:
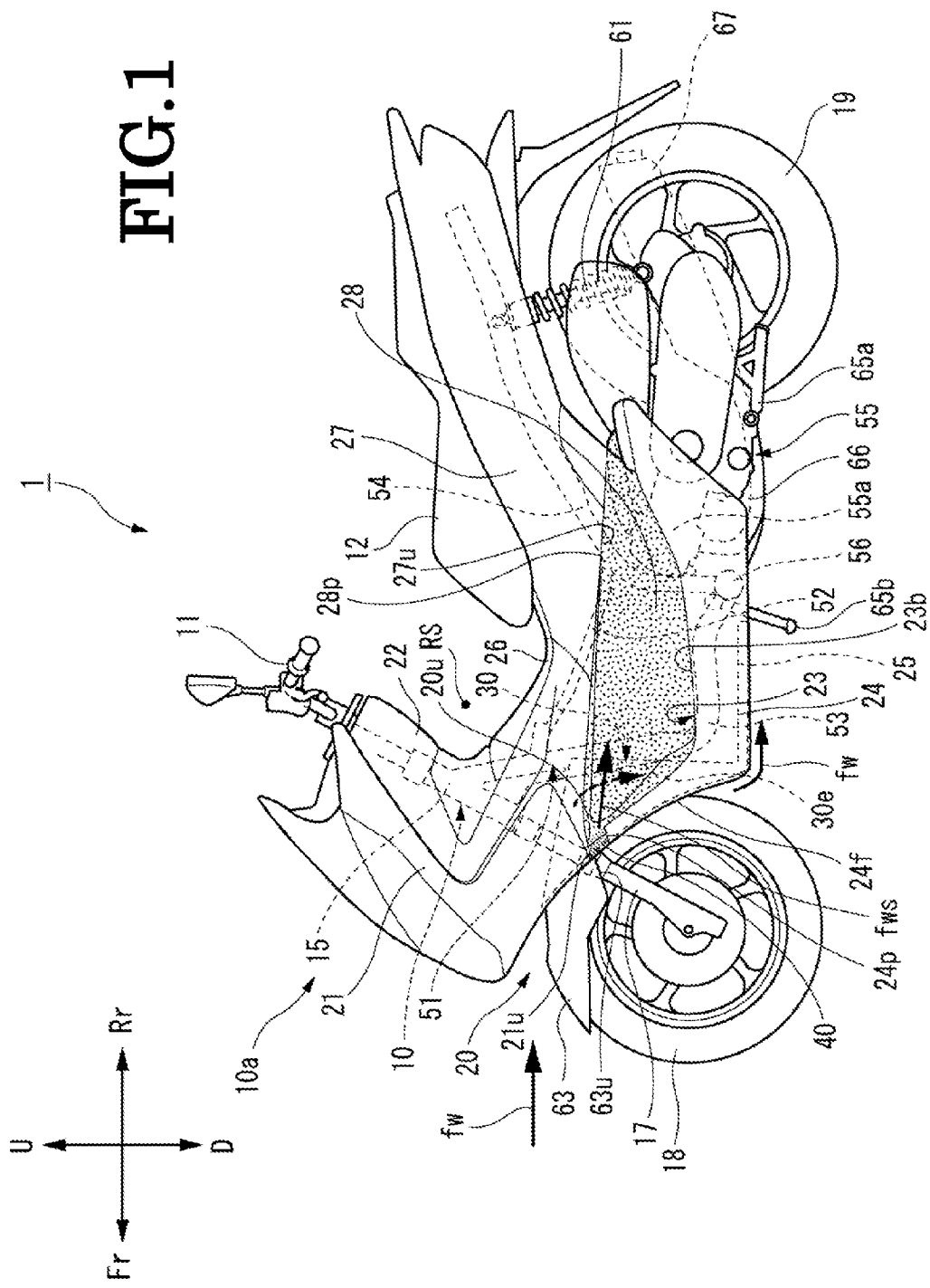
FIG. 1 is a left side view of a motorcycle which adopts one embodiment of a body cover construction according to the invention.

Referring to FIGS. 1 to 9, an embodiment of a body cover construction of a motorcycle according to the invention will be described. The drawings should be seen in a direction in which reference numerals given therein look normal. Fr, Rr, U, D, R, L shown in the drawings denote a front direction, a rear direction, an upper or upward direction, a lower or downward direction, a rightward direction, and a leftward direction of a vehicle of the embodiment, respectively.

A motorcycle 1 of this embodiment includes a body frame 10. This body frame 10 includes, as shown in FIG. 1, a headstock 15 which is provided at a body front portion 10a, a main frame 51 which extends rearwards and downwards from the headstock 15, a front frame 52 which extends substantially rearwards from a middle portion of the main frame 51, a lower frame 53 which extends rearwards from a lower end of the main frame 51, and a rear frame 54 which extends upwards from a rear end of the lower frame 53 and then extends rearwards and upwards.

The motorcycle 1 includes a front fork 17 which is attached rotatably to the headstock 15, a steering handlebar 11 which is attached to an upper end portion of the front fork 17, a front wheel 18 which is mounted rotatably at a lower end portion of the front fork 17, a power unit 55 which is mounted so as to swing up and down via links which are supported on a pivot 56 at a rear end portion of the lower frame 53, a rear wheel 19 which is mounted at a rear end portion of the power unit 55, rear cushions 61 which are mounted between a rear end of the power unit 55 and the rear frame 54, and a mounting seat 12 which is supported on the rear frame 54.

A main stand 65a and a side stand 65b are provided on the lower frame 53. An exhaust pipe 66 extends downwards from a cylinder portion 55a of the power unit 55 towards a bottom of a vehicle body, passes below the power unit 55 and connects to a muffler 67 at a rear of the vehicle body. The body frame 10 and the individual constituent members are covered externally by a body cover 20 as required.

As shown in FIG. 1, the body cover 20 has a front cover 21 which covers continuously a front side and lateral sides of the headstock 15 and an inner cover 22 which covers a rear portion of the front cover 21. The body front portion 10a is covered by the front cover 21 and the inner cover 22. The body cover 20 has a center cover 26 which extends rearwards from the inner cover 22 to cover a center (both sides of the front frame 52) of the body frame 10 and side covers 27 which extend further rearwards from the center cover 26 to cover both sides (both sides of the rear frame 54) of a rear portion of the body frame 10.

The body cover 20 has further lower side covers 28 which cover both sides of lower portions of the center cover 26 and the side covers 27 and include individually left and right step floor boards 23 on which feet of a rider rest, left and right under side covers 24 which extend downwards from outer edges of the step floorboards 23, an undercover 25 which covers a space defined between lower edge portions 24e of the left and right under side covers 24, and a front lower cover 30 at a lower side of the front cover 21.

The undercover 25 is disposed so as to cover a body lower surface which lies further forwards than the power unit 55 in a position lying further rearwards towards the rear of the vehicle body than the front lower cover 30. In the motorcycle 1 of this embodiment, a space surrounded by the inner cover 22, the center cover 26 and the mounting seat 12 is formed as a straddle space RS which facilitates the mounting or dismounting of the rider on or from the motorcycle 1. A front mudguard 63 is provided at a frontmost portion of the vehicle body so as to cover an outer circumference of the front wheel 18 from thereabove.

In the body cover 20 of this embodiment, when the vehicle body is seen from a side thereof, a lower side cover 28 is provided in an area defined between the front wheel 18 and the rear wheel 19 and in a substantially vertical center of the vehicle body. An upper end edge portion 28p of this lower side cover 28 forms a substantially horizontal line in a front-to-rear direction of the vehicle body. This upper end edge portion 28p is formed so as to overlap a lower edge portion 21u of a front side surface of the front cover 21 at a front side thereof. On the other hand, the upper end edge portion 28p is formed so as to overlap a lower edge portion 27u of a side surface of the side cover 27 at a rear side of the upper end edge portion 28p. In this way, a single line formed in the front-to-rear direction of the vehicle body by the lower edge portion 21u of the front side surface and the lower edge portion 27u of the side surface and the upper end edge portion 28p which overlap each other highlights an external shape of the vehicle body.

Figure 2:
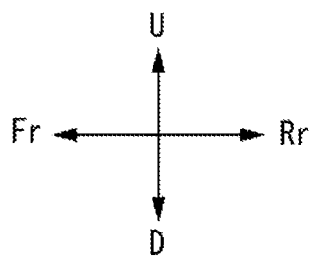
FIG. 2 is an enlarged side view of a main part of the motorcycle shown in FIG. 1.
Figure 2:
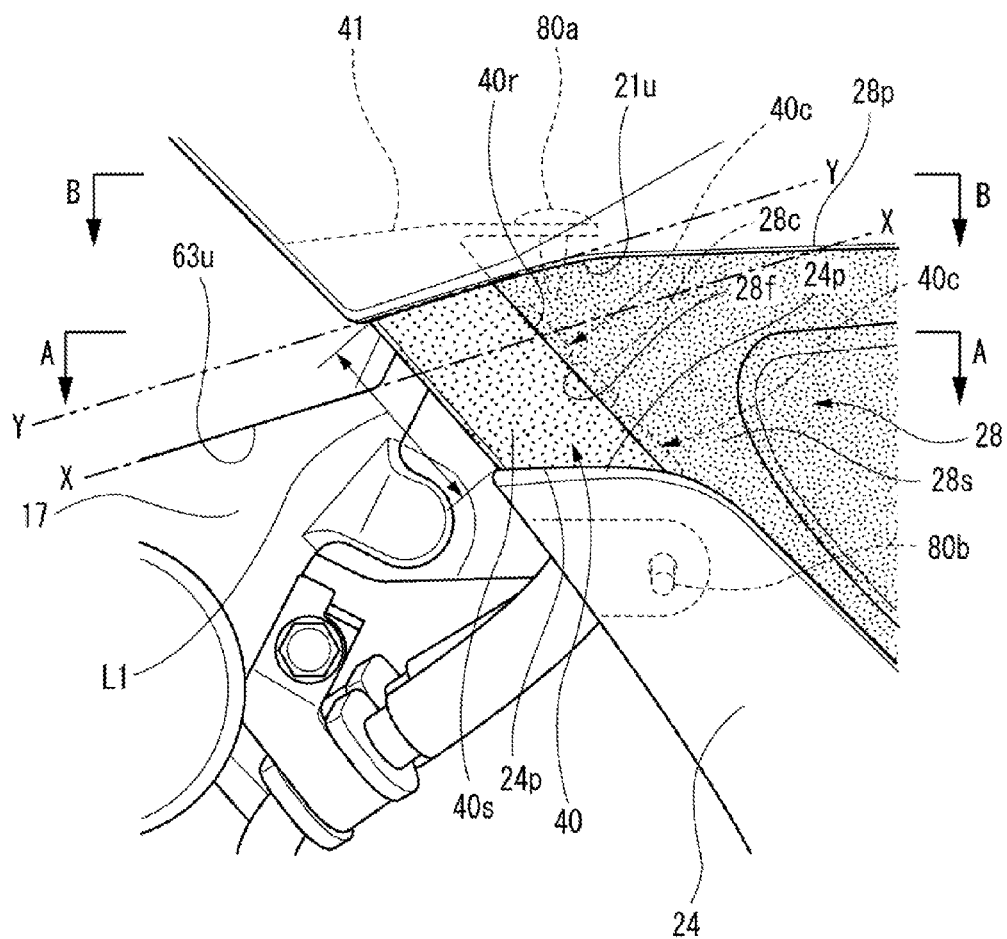

As described above, when the vehicle body is seen from the side thereof, the lower edge portion 21u of the front side surface of the front cover 21 not only extends in the front-to-rear direction of the vehicle body but also is formed substantially at the same lever as a lower edge portion 63u of a mudguard side surface of the front mudguard 63 as shown in FIGS. 1 and 2. As a result of this, the lower edge portion 21u of the front side surface of the front cover 21 and the lower edge portion 63u of the mudguard side surface of the front mudguard 63 form a substantially continuous line and further extends to the rear of the vehicle body as a line which continues to the upper end edge portion 28p of the lower side cover 28. Namely, the line X-X and the line Y-Y are formed substantially continuously.

In FIG. 2 which is an enlarged view, the lower edge portion 21u of the front side surface and the lower edge portion 63u of the mudguard side surface are slightly offset from each other. However, when the vehicle body is wholly seen from the side thereof, as shown in FIG. 1, the lower edge portion 63u of the mudguard side surface which starts from a frontmost end portion of the vehicle and the lower edge portion 21u of the front side surface are formed into a shape which can be identified as a continuous line. The line X-X which is formed by the lower edge portion 63u of the mudguard side surface moves across the line Y-Y which is formed by the lower edge portion 21u of the front side surface as the front fork 17 extends or contracts, and therefore, the line X-X and the line Y-Y are shaped so as to be closer to each other when the rider sits on the mounting seat 12. A front upper end portion 24p of the under side cover 24 extends upwards to a position which is spaced a predetermined distance L1 away from the lower edge portion 21u of the front side surface. Then, the lower edge portion 63u of the mudguard side surface is situated between the front upper end portion 24p and the lower edge portion 21u of the front side surface which are positioned vertically.

Referring to FIGS. 3 to 9, the front lower cover 30 will be described in detail.

Figure 3:
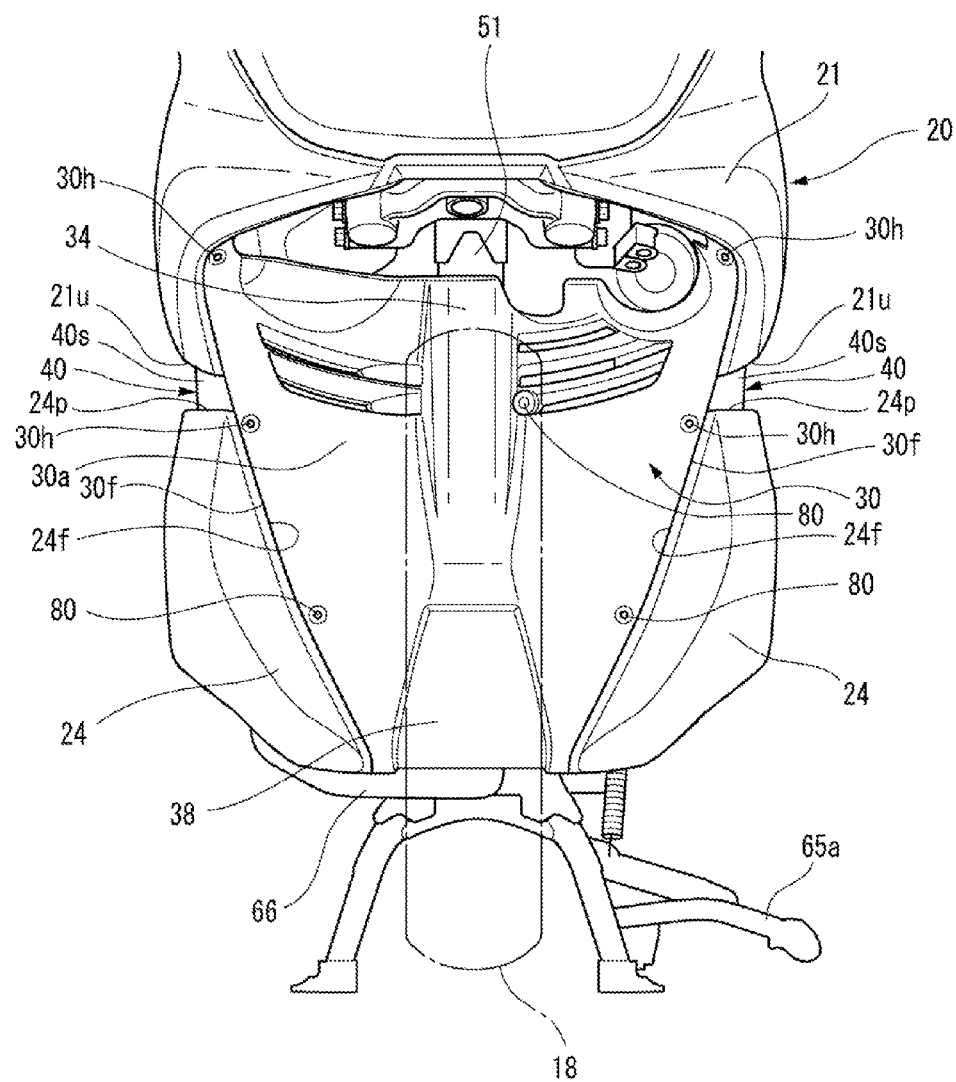
FIG. 3 is a front view of the motorcycle shown in FIG. 1 which shows a state in which a front wheel portion is removed.

The front lower cover 30 is, as shown in FIG. 3, disposed to extend from sides to a rear of an upper portion of the front wheel 18 below the front cover 21. The front lower cover 30 includes an opposite surface 30a (refer to FIG. 4) which is formed by a curved surface which curves towards the direction of the vehicle body so as to permit the front wheel 18 to turn. In the front lower cover 30, front edge portions 30f (refer to FIG. 4) of both side surfaces are connected to front edges 24f of the under side covers 24, and a rear end edge 37e is connected to a front end edge 25f of the undercover 25.

Figure 4:
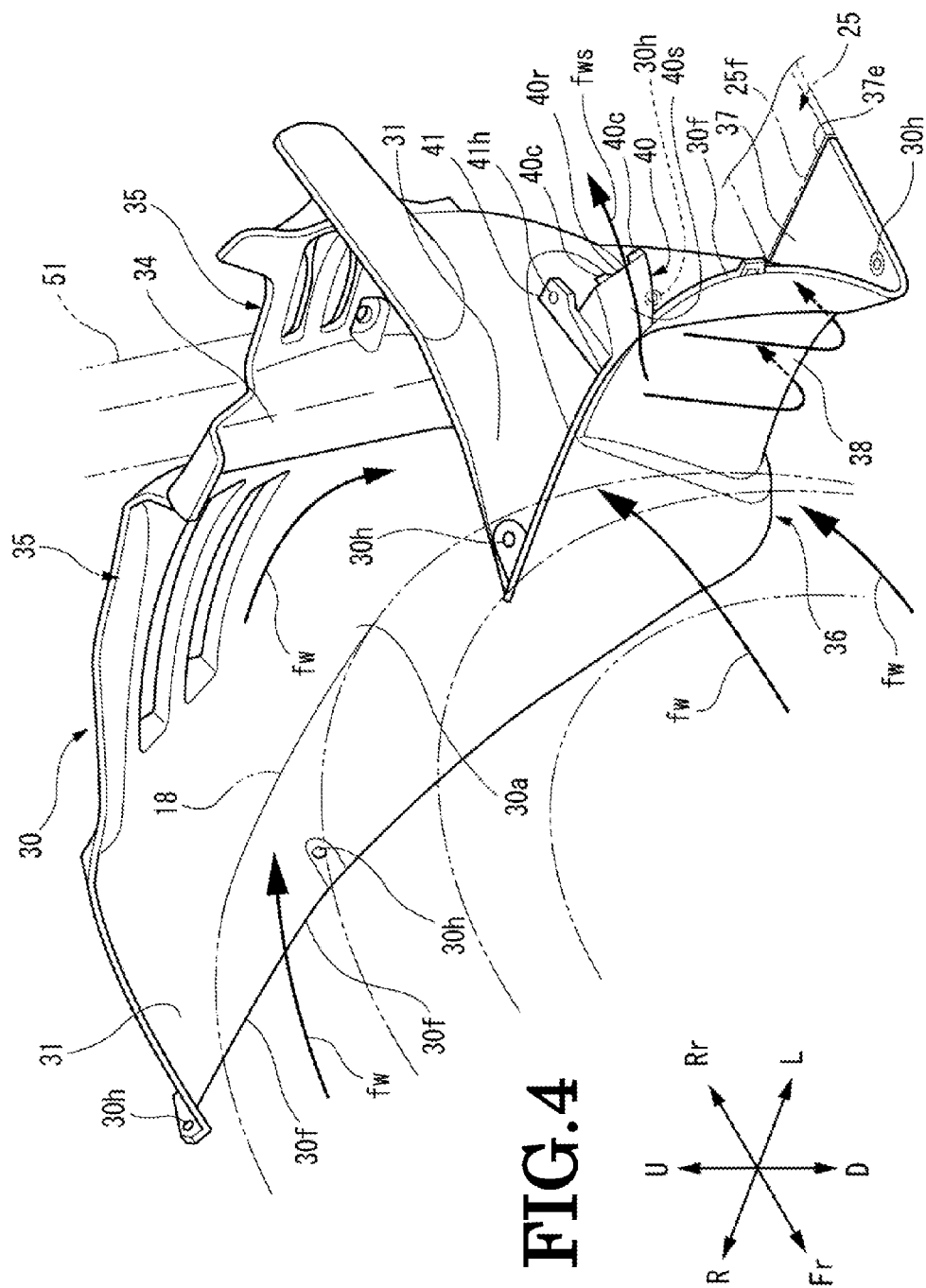
FIG. 4 is a perspective view of a front lower cover of the motorcycle shown in FIG. 1.
Figure 5:
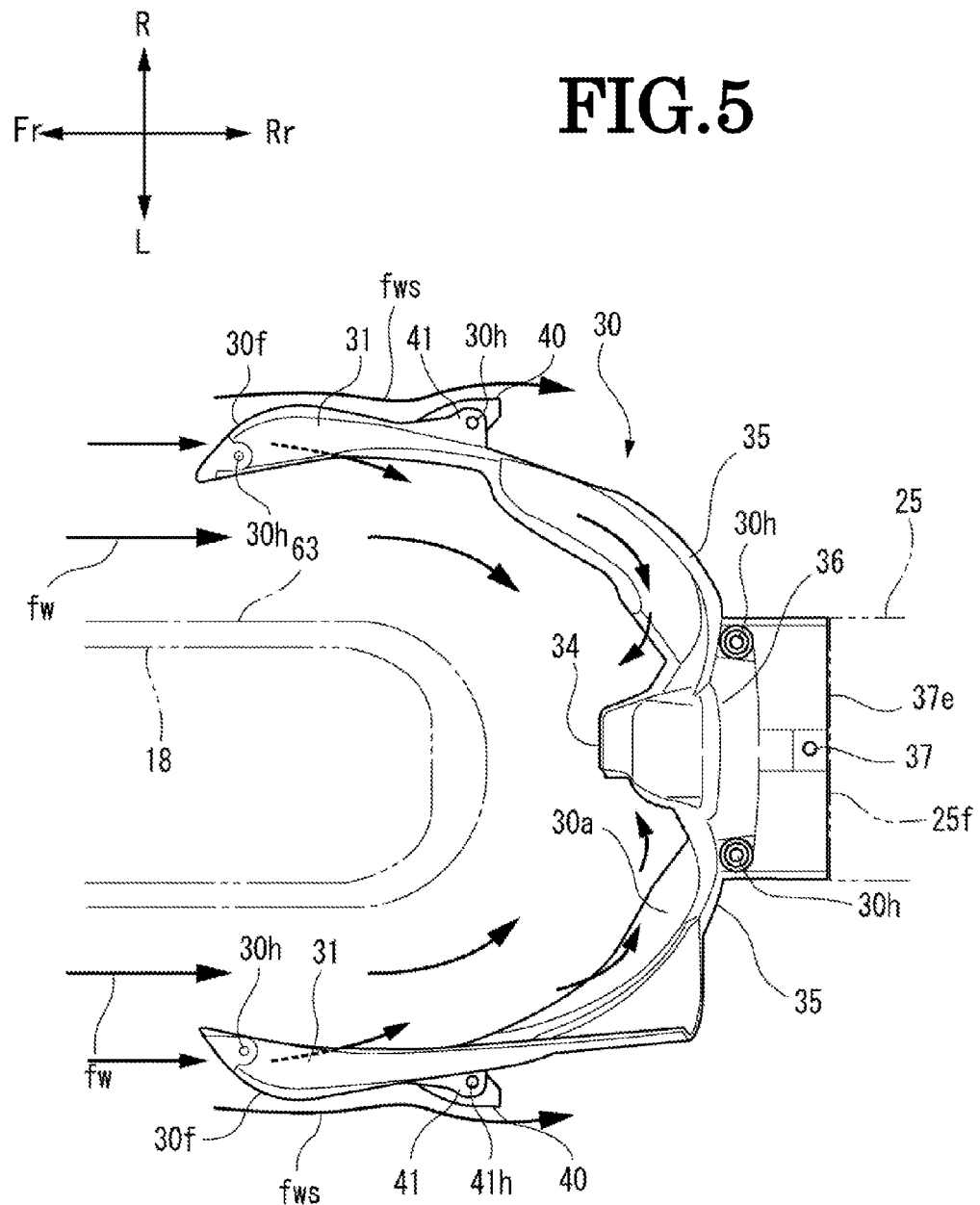
FIG. 5 is a plan view of the front lower cover of the motorcycle shown in FIG. 1.

As shown in FIGS. 4 and 5, the front lower cover 30 includes a swelling portion 34 where the opposite surface 30a which faces opposite to the front wheel 18 is caused to swell to the front of the vehicle body. The front lower cover 30 has rear walls 35, 35 at both left- and right-hand sides of the swelling portion 34, and these rear walls 35, 35 swell into curved surfaces which swell further rearwards towards the rear of the vehicle body than the swelling portion 34. Front upper portions 31, 31 are provided which continuously extend from the corresponding rear walls 35, 35 to the front of the vehicle body. These front upper portions 31, 31 are formed as wall surfaces in which their distal inner surfaces (the opposite surface 30a) are slightly twisted downwards towards the bottom of the vehicle body.

The swelling portion 34 swells towards the front of the vehicle body so as to follow the main frame 51 which extends downwards towards the bottom of the vehicle body from the headstock 15. This swelling portion 34 has an inclined surface construction in which an upper end portion projects most towards the front of the vehicle while the swelling recedes towards the rear of the vehicle body as the swelling portion 34 extends downwards so as to match the inclination of the main frame 51.

The front lower cover 30 includes a curved portion 36 which swells forwards and downwards of the vehicle at a lower portion side thereof. A bottom portion 37 is formed so as to extend substantially horizontally from this curved portion 36 towards the rear of the vehicle body. When viewed from a bottom thereof, the curved portion 36 is formed in to a curved shape which curves towards the rear of the vehicle body in such a way that a laterally central portion is located in a rearmost position.

When seen from the front, the front lower cover 30 is formed, as shown in FIG. 3, so that left and right front edge portions 30f, 30f narrow a space therebetween as they extend downwards. When seen from the side, the front lower cover 30 is formed into a curved shape in which the front edge portion 30f swells towards the rear of the vehicle. The front lower cover 30 has at a lower end thereof a bottom portion 37 which extends horizontally, and hence, the front lower cover 30 has a substantially triangular shape (refer to FIG. 1). A recess portion 38 is formed in the front lower cover 30 which is depressed from the opposite surface 30a including the curved portion 36 to the bottom portion 37 so as to be depressed more towards the rear of the vehicle body at a transversely central portion than at transversely outer portions thereof.

The front lower cover 30 which is formed in the way described above can guide air flows fw which are received from the front in the periphery of the front wheel 18 to the lower portion of the vehicle body in an effective fashion.

In this embodiment, the front lower cover 30 is fixed appropriately by tightening fixing members 80, 80a, 80b into plural holes 30h, 41h.

Figure 8:
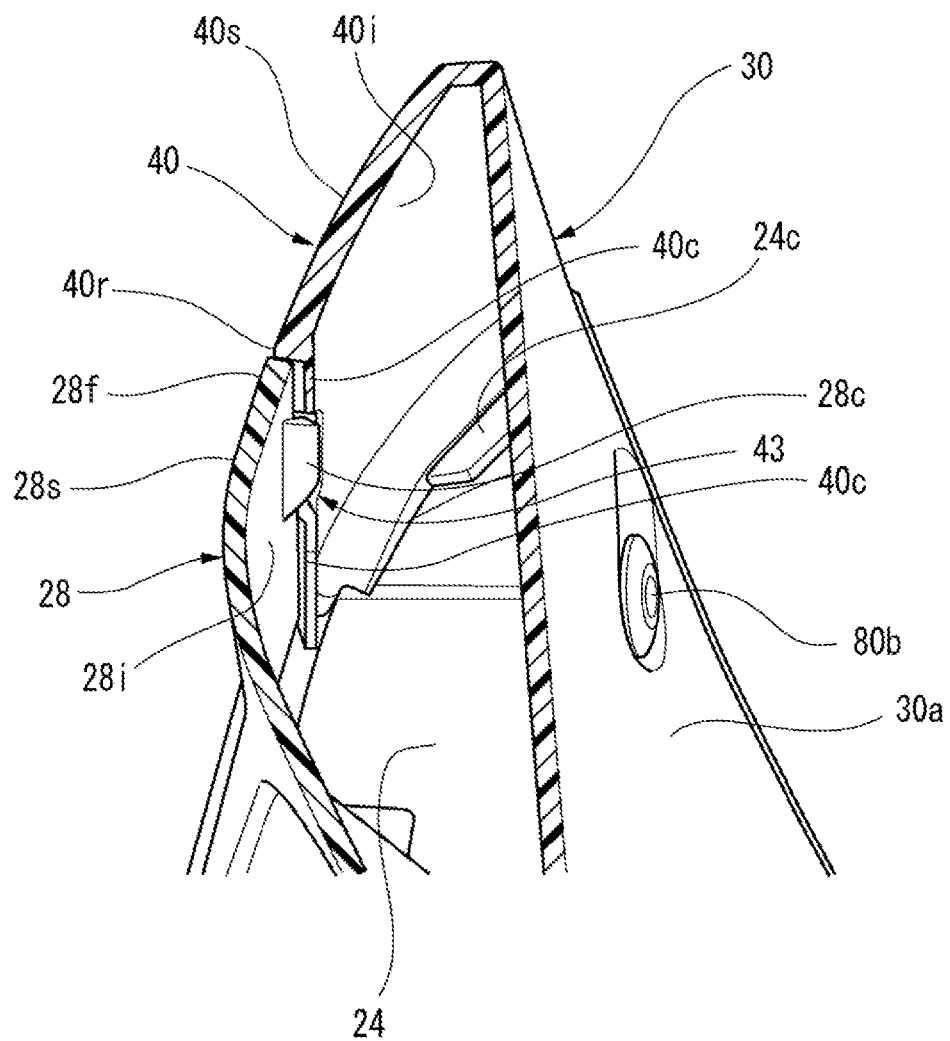
FIG. 8 is a horizontal sectional view of a portion taken along the line A-A in FIG. 3.

Projecting portions 40 are formed individually on the left and right front edge portions 30f of the front lower cover 30. The projecting portion 40 projects between the lower edge portion 21u of the front side surface of the front cover 21 and a front upper end portion 24p of the under side cover 24 so as to be exposed to the external surface of the body cover 20. The projecting portion 40 has a projecting main body portion 40a which curves convexly towards the front of the vehicle body, as shown in FIG. 4. The projecting main body portion 40a projects so as to gradually swell from the front edge portion 30f towards the rear of the vehicle body. Namely, as shown in FIG. 8, in a horizontal cross-sectional shape, the projecting main body portion 40a is shaped so as to project towards the front of the vehicle body.

In this embodiment, the step floorboard 23 has a foot rest portion 23b which projects substantially horizontally towards an outer side of the vehicle body and which extends in the front-to-rear direction of the vehicle body and rises upwards towards the top of the vehicle body from the foot rest portion 23b to thereby constitute the lower side cover 28. Then, this lower side cover 28 is formed so as to continue to the projecting portion 40. Namely, a front end edge portion 28f of the lower side cover 28 and a rear end edge portion 40r of the projecting portion 40 are continuously connected to each other so as to form substantially a single continuous plane.

Figure 6:
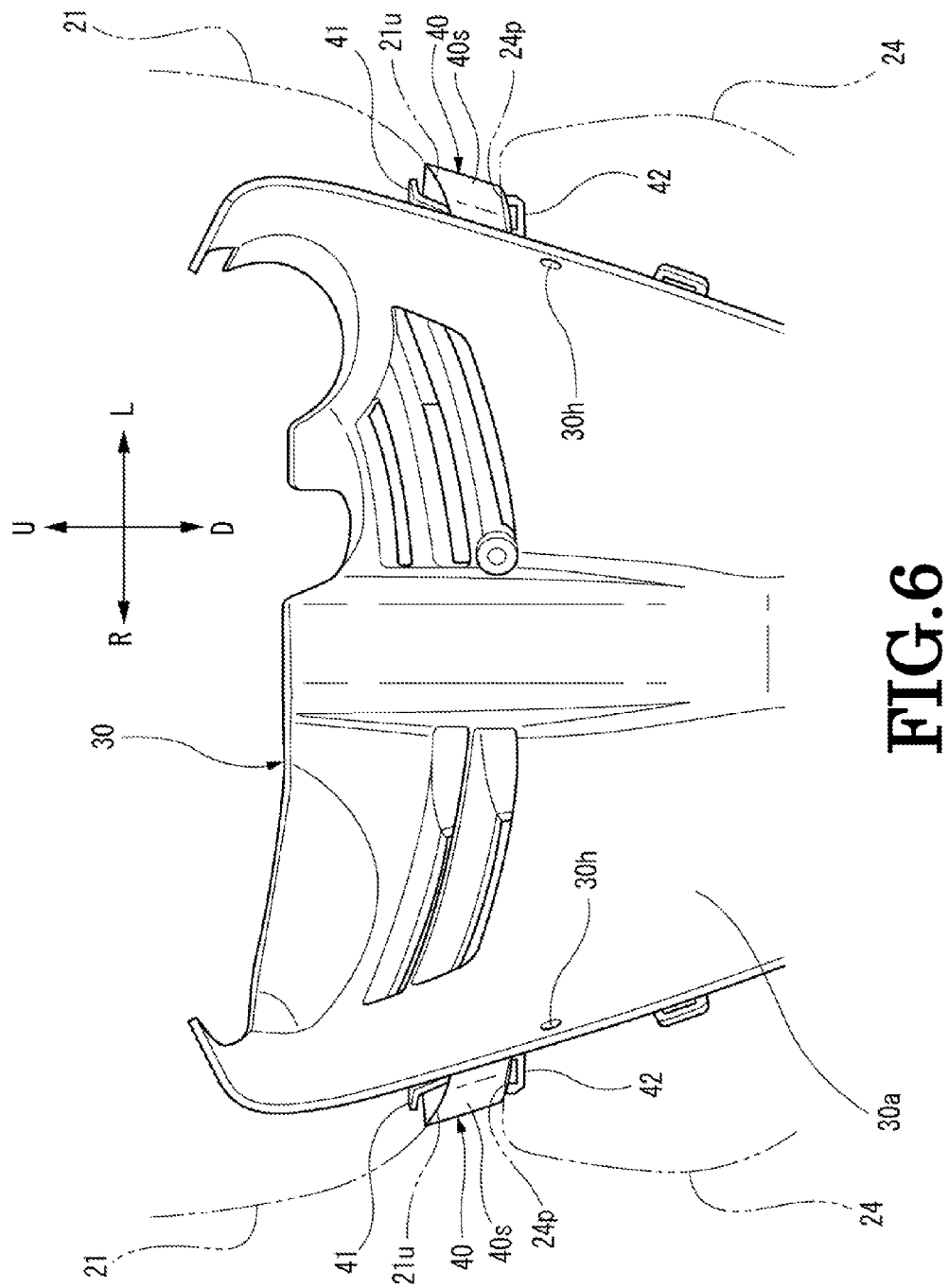
FIG. 6 is an enlarged front view of a main part of the front lower cover of the motorcycle shown in FIG. 1.

In this embodiment, an external surface 40s of the projecting portion 40 has a step which produces a difference in level in a widthwise direction of the vehicle body and is hence formed so as to be depressed in the widthwise direction in relation to the front cover 21 and the under side cover 24. Namely, as shown in FIGS. 3 and 6, when seen from the front of the vehicle body, the external surface 40s of the projecting portion 40 is shaped so as to be depressed more towards a central portion of the vehicle body than the lower edge portion 21u of the front side surface of the front cover 21 and the front upper end portion 24p of the under side cover 24.

Figure 9:
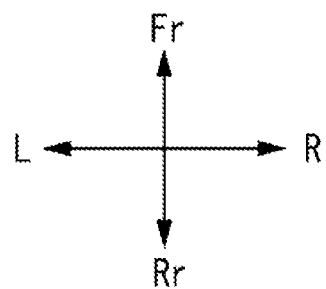
FIG. 9 is a horizontal sectional view a portion taken along the line B-B in FIG. 2.
Figure 9:
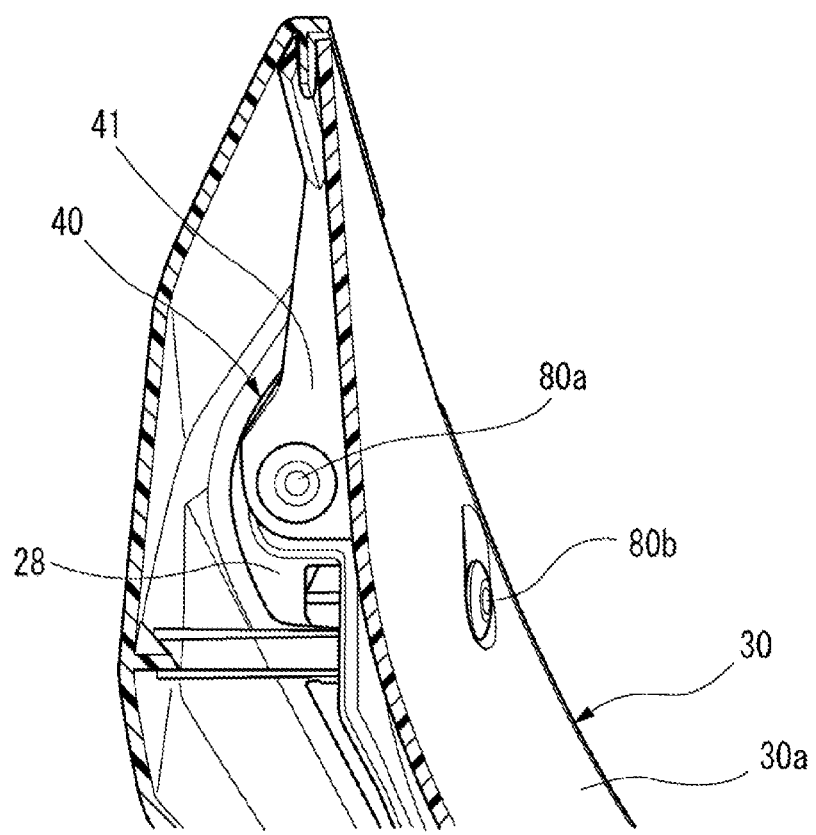

An engagement construction of the projecting portion 40 of this embodiment will be described by reference to FIGS. 7 to 9.

Figure 7:
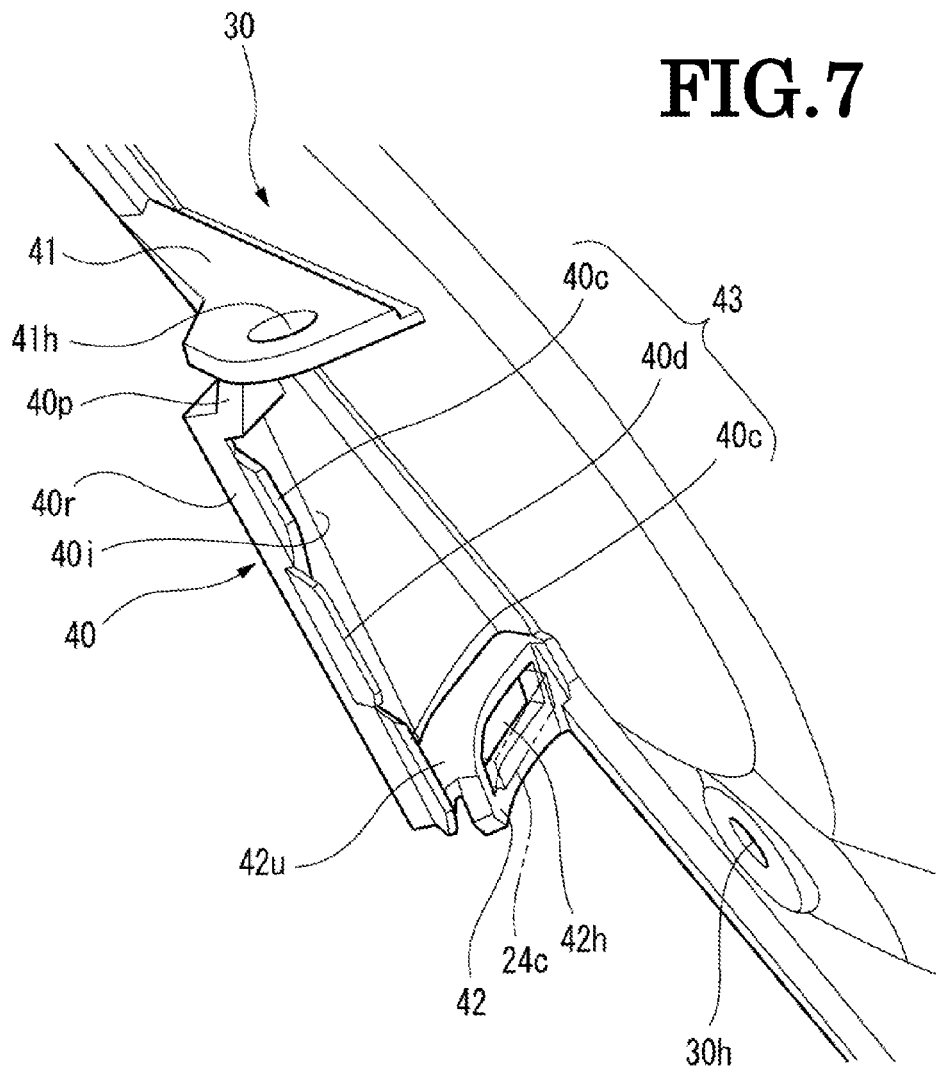
FIG. 7 is an enlarged perspective view of a main part of the front lower cover of the motorcycle shown in FIG. 1.

The projecting portion 40 of this embodiment includes, as shown in FIG. 7, three locking portions 41, 42, 43 at an upper portion, a lower portion and a side portion, respectively, of the projecting main body portion 40a which is formed as the exposed portion.

As a first engagement construction, a machine screw hole 41h is provided in the upper locking portion 41 so as to penetrate therethrough in a vertical direction. Then, a mounting screw 80a is screwed through this machine screw hole 41h. Consequently, the projecting portion 40 of the front lower cover 30 and the lower side cover 28 (refer to FIG. 9) are connected together.

As a second engagement construction, a substantially rectangular engagement hole 42h is opened substantially horizontally towards the rear of the vehicle body in the lower locking portion 42. Then, an engagement projection 24c which is provided on an inner side of the under side cover 24 is inserted into the engagement hole 42h (refer to FIG. 8). The under side cover 24 and the front lower cover 30 are connected together via a mounting screw 80b in such a state that the engagement projection 24c and the engagement hole 42h are in engagement with each other.

As a third engagement construction, as shown in FIG. 7, two projecting pieces 40c are provided at the side locking portion 43 with a predetermined space defined therebetween. The two projecting pieces 40c are provided on a projecting portion inner side 40i of the rear end edge portion 40r of the projecting portion 40 so as to extend therefrom towards the rear of the vehicle body. A recess portion 40d is formed between the two projecting pieces 40c on the projecting portion inner side 40i.

On the other hand, an engagement construction is provided on the lower side cover 28 so as to correspond to the side locking portion 43. To describe this in detail, a front end projecting piece 28c is provided on an inner side 28i of the front end edge portion 28f of the lower side cover 28 so as to be situated between the two projecting pieces 40c. Namely, the front end projecting piece 28c corresponds to the side locking portion 43 so that a distal end portion thereof is brought into engagement with the recess portion 40d from the projecting portion inner side 40i. Consequently, the projecting portion 40 and the lower side cover 28 are brought into engagement with each other so that the projecting piece 40c and the front end projecting piece 28c project on the inner sides thereof. By doing so, the rear end edge portion 40r of the projecting portion 40 and the front end edge portion 28f of the lower side cover 28 are locked together in such a way as to be hooked. As a result of this, the external surface 40s of the projecting portion 40 and a lower side cover external surface 28s can be connected together so as to form a single continuous plane.

In this embodiment, the first engagement construction constitutes the vertical or height-wise fastening, while the second engagement construction constitutes the transverse or widthwise fastening. In this way, the fastening directions are caused to intersect each other, whereby the front lower cover 30 can be supported rigidly and strongly.

In this embodiment, the engagement portions of the front lower cover 30, the lower side cover 28 and the under side cover 24 are concentrated on the projecting portion 40. By collecting the plural engagement portions to the projecting portion 40 in the way described above, the body covers can be supported in plural supporting directions, whereby the front lower cover 30 can be supported more strongly by the projecting portion 40.

Air flows which flow through the area defined by the front cover 21 and the front wheel 18 when the motorcycle 1 of this embodiment runs basically flow over the surface of the body cover 20 from the front towards the rear of the vehicle body. Here, air flows fw which flow through the periphery of the front wheel 18 are divided, for example, at a lower side of the vehicle body to produce air flows fw which flow along an inner side of the front lower cover 30 and air flows fws which flow along the side portion of the vehicle body.

The air flows fw on the inner side of the front lower cover 30 flow, as shown in FIGS. 4 and 5, for example, in such a way as to strike the front lower cover 30 from the upper and left and right sides of the front wheel 18 and then flow to the lower portion of the vehicle body along the opposite surface 30a of the front lower cover 30.

Part of the air flows fws which flow along the sides of the front wheel 18 to flow then along the side portions of the body cover 20 flow, as shown in FIGS. 3 and 6, over the surfaces of the projecting portions 40 to be guided to the rear. The projecting porting portions 40 are formed so as to be tapered off towards the front of the vehicle body in relation to the air flows fws (refer to FIG. 8), whereby the resistance of the air flows fws is reduced. The projecting portions 40 are each formed into the depressed shape (refer to FIG. 6) which constitutes the step which is lower in level between the front cover 21 which is at the upper side and the under side cover 24 which is at the lower side thereof, and therefore, the air flows fws are allowed to pass over the surfaces of the projecting portions 40 to be guided towards the rear, thus forming air flows which flow along the lower side covers 28.

In this embodiment, the projecting portions 40 and the lower side covers 28 are formed in a different color from that of the front cover 21. The projecting portions 40 and the lower side covers 28 are also formed in a different color from that of the under side covers 24.

The projecting portions 40 and the lower side covers 28 do not have to be positively different in color from the front cover 21 and the under side covers 24. By adopting a configuration in which the projecting portions 40 and the lower side covers 28 are simply formed from a different material from that from which the front cover 21 and the under side covers 24 are formed, the surface members of the body cover 20 can be identified as easily as in the case of the different colors being used for the surface members.

Thus, as has been described heretofore, according to the motorcycle body cover construction of this embodiment, when the vehicle body is seen from the side thereof, the line Y-Y formed by the lower edge portion 21u of the front side surface and the line X-X formed by the lower edge portion 63u of the mudguard side surface of the front mudguard 63 are formed so as to constitute substantially the single continuous line. Consequently, by including the front mudguard 63 in the exterior of the body cover 20, it is possible to form the long continuous body shaping line which extends from the frontmost end portion of the vehicle body to the vicinity of the rear wheel 19 in the front-to-rear direction. As a result of this, it is possible to represent the highlighting line which continues from the side surface of the body cover 20 at the rear of the vehicle body to the frontmost end of the vehicle body, and therefore, it is possible to form the highlighting line which is long in the front-to-rear diction and which has never been realized heretofore, thereby imparting the originality to the shape of the vehicle body.

The front upper end portion 24p of the under side cover 24 extends upwards to the position which is spaced the predetermined distance L1 away from the lower edge portion 21u of the front side surface, whereby the lines formed by the lower edge portion 63u of the mudguard side surface and the lower edge portion 21u of the front side surface can be highlighted from the lower side of the vehicle body.

According to the motorcycle body cover construction of this embodiment, the projecting portion 40, which is exposed between the lower edge portion 21u of the front side surface and the front upper end portion 24p and which faces the external surface of the body cover 20, is formed on the front cover 30. Therefore, the member which is not visible in the conventional body cover construction is exposed. As a result of this, when the vehicle body is seen from the side thereof, the originality of the body shaping line in the lower portion of the front cover 21 can be highlighted further by the appearance of the exposed portion which has never been produced in the conventional body construction.

The projecting portion 40 is formed so as to curve convexly towards the front of the vehicle body, and this can enhance the rigidity of the front lower cover 30 which bears air flows on the substantially whole area thereof.

In the horizontal cross-sectional shape, the projecting portion 40 is formed so as to be tapered off towards the front of the vehicle body, and therefore, it is possible to reduce the resistance of air flows.

According to the motorcycle body cover construction of this embodiment, the step floorboard 23 constitutes the lower side cover 28 which rises upwards from the foot rest portion 23b towards the top of the vehicle body, it is possible to provide the longitudinal accent which highlights the vehicle body shape substantially in the center of the side surface of the vehicle body. The front end edge portion 28f of the lower side cover 28 and the rear end edge portion 40r of the projecting portion 40 are formed continuously, and therefore, when the vehicle body is seen from the side thereof, the front lower cover 30 which has the projecting portion 40 and the lower side cover 28 continue to form the single line Y-Y which contacts the lower edge portion 21u of the front side surface. As a result of this, the long line in the front-to-rear direction of the vehicle body which includes the lower edge portion 21u of the front side surface can be identified easily, thereby enhancing the originality of the vehicle body shape.

The front end edge portion 28f of the lower side cover 28 and the rear end edge portion 40r of the projecting portion 40 continue to form the substantially single plane, and therefore, the air flows fws guided from the projecting portion 40 are allowed to flow to the rear of the vehicle body by way of the lower side cover 28. Consequently, the air flows are allowed to pass to the leg portions of the rider appropriately, thereby enhancing the riding comfort of the rider.

According to the motorcycle body cover construction of this embodiment, there is provided the step or difference in level between the projecting portion 40 and the lower edge portion 21u of the front side surface, and therefore, the line Y-Y along the lower edge portion 21u of the front side surface can be highlighted further, thereby enhancing the originality of the vehicle body shape further.

The projecting portion 40 has the step in the widthwise direction of the vehicle body and is formed so as to be depressed in the widthwise direction in relation to the front cover 21 and the under side cover 24. Therefore, air flows fws are allowed to be guided towards the rear of the vehicle body by making use of the step portion. As a result of this, the air flows fws are allowed to pass to the leg portions of the rider appropriately, thereby enhancing the riding comfort of the rider.

According to the motorcycle body cover construction of this embodiment, the projecting portion 40 and the lower side cover 28 are formed from the different material or in the different color in relation to the front cover 21 or the under side cover 24. Therefore, the line Y-Y along the lower edge portion 21u of the front side surface can be distinct. Consequently, in the body cover 20, this can make the front cover 21 or the under side cover 24 prominent in external appearance. Consequently, the originality of the vehicle can be highlighted not only by the lines but also by color and tonality, whereby the originality of the vehicle can be enhanced further.

According to the motorcycle body cover construction of this embodiment, the projecting portion 40 has the connecting construction in which the projecting portion 40 is locked on the body cover 20 lying adjacent thereto via the locking portions 41, 42, 43, and therefore, not only can the projecting portion 40 be held rigidly and strongly, but also the body cover 20 which lies adjacent thereto such as the under side cover 24 or the lower side cover 28 can be supported rigidly and strongly. The front lower cover 30 which bears air flows coming from the front thereof can be held rigidly and strongly by the projecting portion 40.

The invention is not limited to the embodiment described above and hence can be modified as required without departing from the spirit and scope of the invention.

For example, in the embodiment described above, the external surface 40s of the projecting portion 40 is described as having the step or different in level in the widthwise direction of the vehicle body to thereby be formed so as to be depressed in the widthwise direction in relation to the front cover 21 and the under side cover 24. However, the invention is not limited thereto, and hence, the projecting portion 40 may be formed so as to be depressed in relation to either of the front cover 21 and the under side cover 24.

In the embodiment described above, the projecting portion 40 includes the engagement construction between the under side cover 24 and the lower side cover 28. However, the invention is not limited thereto, and hence, the projecting portion 40 should be locked on at least one of the body cover 20 which lies adjacent thereto.

DESCRIPTION OF REFERENCE NUMERALS AND CHARACTERS 1 motorcycle
10 body frame
10a body front portion
11 steering handlebar
12 mounting seat
15 headstock
18 front wheel
19 rear wheel
20 body cover
21 front cover
21u lower edge portion of front side surface
22 inner cover
23 step floorboard
23b foot rest portion
24 under side cover
24p front upper end portion
25 under cover
26 center cover
27 side cover
28 lower side cover
28f front end edge portion
30 front lower cover
40 projecting portion
40r rear end edge portion
40s external surface
41, 42, 43 locking portion
51 main frame
55 power unit
63 front mudguard
63u lower edge portion of mudguard side surface
fw, fws air flows
line X-X line formed by lower edge portion of mudguard side surface
line Y-Y line formed by lower edge portion of front side surface

The invention claimed is:

1. A body cover construction for a motorcycle comprising a body cover having:
a front mudguard which is provided so as to cover an outer circumference of a front wheel from thereabove;
a front cover which covers a front portion of a vehicle body from a front to sides of a headstock;
step floorboards which are disposed to extend from a lower and rear portion of the front cover to below a mounting seat so that feet of a rider rest thereon; and
under side covers which cover sides of the vehicle body which lie below and forward of the step floorboards,
wherein a lower edge portion of a front side surface of the front cover extends in a front-to-rear direction and is formed substantially at the same level as a lower edge portion of a mudguard side surface of the front mudguard such that the lower edge portion of the front side surface of the front cover and the lower edge portion of the mudguard side surface of the front mudguard can be identified as a continuous line when the vehicle body is seen from a side thereof,
wherein a front upper end portion of the under side cover extends upwards to a position which is spaced a predetermined distance away from the lower edge portion of the front side surface,
wherein there is provided a front lower cover which covers a front surface of the vehicle body situated at the rear of the front wheel below the front cover,
wherein a projecting portion is formed on the front lower cover so as to be exposed between the lower edge portion of the front side surface and the front upper end portion so that the projecting portion faces an external surface of the body cover, and
wherein the projecting portion curves convexly towards the front of the vehicle body.

2. The body cover construction for the motorcycle of claim 1,
wherein the step floorboard constitutes a lower side cover which rises upwards from a foot rest portion which extends in the front-to-rear direction, and
wherein a front end edge portion of the lower side cover and a rear end edge portion of the projecting portion are formed continuously.

3. The body cover construction for the motorcycle of claim 2,
wherein the projecting portion and the lower side cover are formed from a different material or in a different color in relation to the front cover or the under side cover.

4. The body cover construction for the motorcycle of claim 1, wherein an external surface of the projecting portion constitutes a step in a widthwise direction and is formed so as to be depressed in the widthwise direction in relation to at least either of the front cover and the under side cover.

5. The body cover construction for the motorcycle of claim 1,
wherein the projecting portion is locked on at least one of the front cover and under side covers, lying adjacent thereto via a locking portion.

* * * * *